United States Patent [19]

Siegwart

[11] 4,141,385
[45] Feb. 27, 1979

[54] FLEXIBLE CORRUGATED TUBE

[76] Inventor: Emil Siegwart, Michael-Blatter-Strasse 6, D 6603 Sulzbach-Neuweiler, Fed. Rep. of Germany

[21] Appl. No.: 774,933

[22] Filed: Mar. 7, 1977

Related U.S. Application Data

[60] Continuation-in-part of Ser. No. 609,993, Sep. 3, 1975, abandoned, Division of Ser. No. 377,984, Aug., 1973, Pat. No. 3,913,623.

[30] Foreign Application Priority Data

Dec. 3, 1976 [DE] Fed. Rep. of Germany ....... 2654963

[51] Int. Cl.² ............................................. F16L 11/16
[52] U.S. Cl. .................................... 138/122; 138/135; 138/136; 138/154
[58] Field of Search ............... 138/121, 122, 129, 134, 138/135, 154, 136

[56] References Cited

U.S. PATENT DOCUMENTS

| 3,578,777 | 5/1971 | DeGain | 138/122 X |
| 3,682,203 | 8/1972 | Foti et al. | 138/135 |
| 3,815,639 | 6/1974 | Westerbarkey | 138/122 X |
| 3,865,146 | 2/1975 | Meserole | 138/122 X |
| 3,913,623 | 10/1975 | Siegwart | 138/122 |
| 4,029,129 | 6/1977 | Harper | 138/122 X |

FOREIGN PATENT DOCUMENTS

| 1299107 | 7/1969 | Fed. Rep. of Germany | 138/122 |
| 1904164 | 8/1969 | Fed. Rep. of Germany | 138/122 |

*Primary Examiner*—Richard E. Aegerter
*Assistant Examiner*—James E. Bryant, III

[57] ABSTRACT

A flexible corrugated tube comprising a succession of convolutions of spirally coiled thin metal strip having the overlapping corrugations of adjacent convolutions locked together by a plurality of spaced apart detents about the circumference of at least one of the sets of overlapping corrugations. Apparatus for forming the tube comprises a grooved roller in which at least one of the grooves comprises ridges extending a limited distance from the groove base toward the roller surface.

6 Claims, 7 Drawing Figures

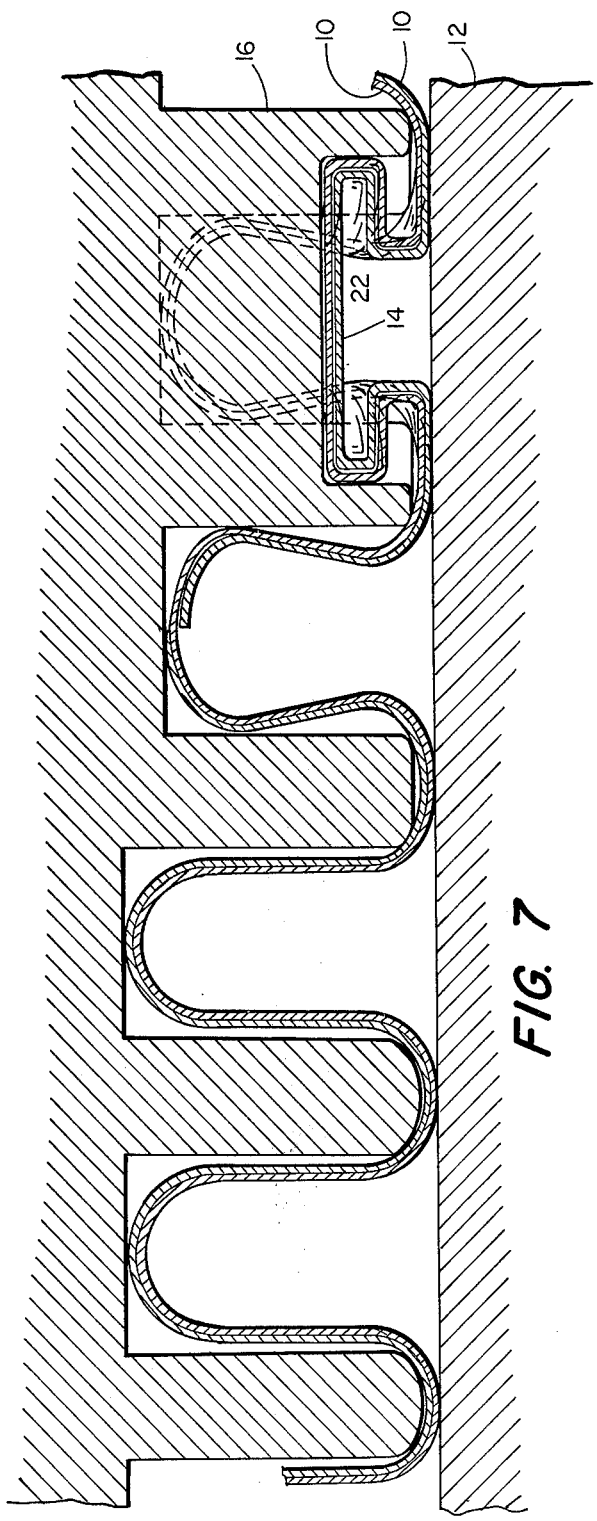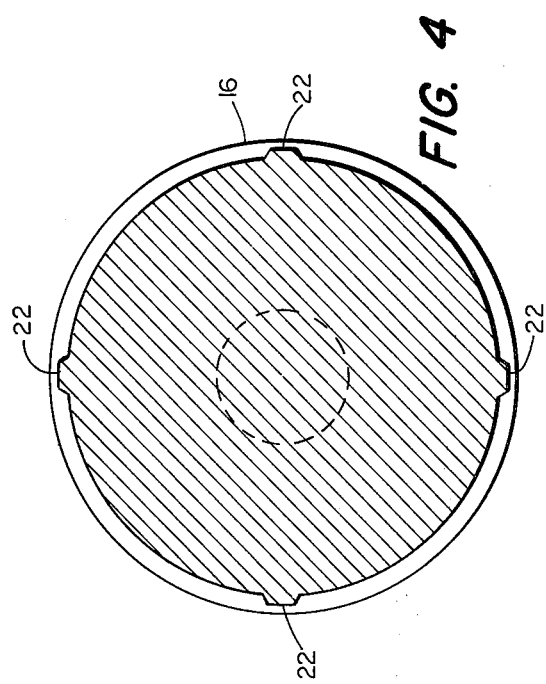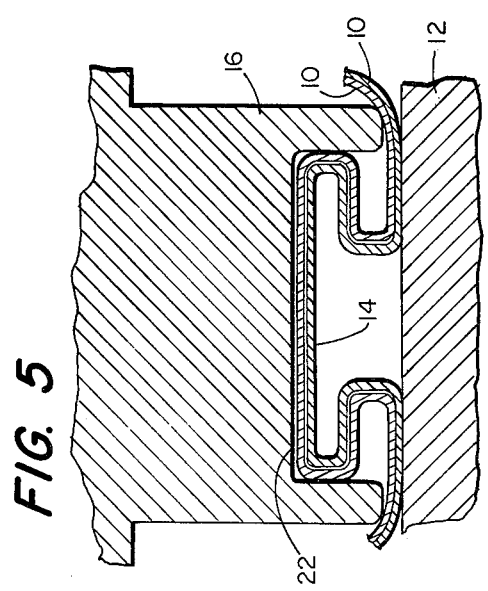

FLEXIBLE CORRUGATED TUBE

This is a continuation-in-part of Application, Ser. No. 609,993, filed Sept. 3, 1975 now abandoned, which in turn is a division of Application, Ser. No. 377,984, filed Aug. 2, 1973, now U.S. Pat. No. 3,913,623, issued Oct. 21, 1975.

This invention relates to a flexible corrugated tube consisting of a succession of axially displaced convolutions obtained by spirally coiling thin metal strip formed with longitudinally extending corrugations which in the finished tube are transformed into spirals coaxial with the tube and to apparatus for making the tube. Tubes of this kind are known.

The invention relates in particular to a tube in which the borders of successive tube convolutions overlap each other.

In the tube according to the invention the corrugations formed in the strip are substantially of wave form, the waves having arcuate crests alternating with similar shaped troughs.

It is an object of the present invention to provide a flexible corrugated tube as described above in which successive convolutions are firmly secured to each other along their overlapping borders without the use of special connecting means, adhesives or the like. It is a further object of this invention to provide means for securing overlapped convolutions which strongly resist axial tension even when the metal is a foil type product. Yet another object of the invention is to provide means for firmly securing the overlapped convolutions which will nevertheless provide significant tube flexibility to permit bending the tube about a short radius.

According to the present invention there is provided a flexible corrugated tube consisting of a succession of axial displaced convolutions obtained by spirally coiling a thin metal strip formed with longitudinally extending corrugations, the corrugations being substantially of wave form, the waves having arcuate crests alternating with similarly shaped troughs, the borders of successive tube convolutions overlapping each other, with at least one corrugation in the overlapping border portion of a convolution fitting into a corrugation of the overlapped border portion of an adjoining convolution. The crests of the overlapped corrugations are provided with detents at spaced positions about the circumference of interfitting corrugations locking the corrugations together.

In preferred embodiments of the tube, the detents are provided in a plurality of corrugations, axially spaced from each other by corrugations having continuous crests and troughs. Axially adjacent detents are circumferentially offset from each other. The detents form crimps of generally S-shaped configuration. In one embodiment also the width of the crests and troughs is greater than therebetween.

Apparatus for producing the flexible metal tube comprises preferably a rotatable mandrel onto which the strip is coiled and at least one pressure roller adapted to cooperate with the mandrel and arranged from the mandrel at a distance corresponding to the thickness of the metal strip, the pressure roller being provided with grooves for receiving the corrugations of the strip. At least one of the grooves comprises a plurality of ridges spaced apart about the groove circumference extending from the base to a position spaced a limited distance from the roll surface, thereby adapted to crimp the corrugations.

In particular embodiments the ridge extends to within about six times the strip material thickness of the roll surface. The ridges and the groove containing the ridges, at least at the ridges, are wider than the corrugations. A plurality of ridge containing grooves are provided spaced from each other by uninterrupted grooves and axially adjacent ridges are circumferentially offset from each other.

At least over part of the axial length of the pressure roller the grooves may be shallower and at least at their bottom wider than the corrugations in the metal strip prior to deformation of the corrugations by compression and the width of ridges situated between the grooves may at least at the bottom of the grooves be less than the width of the corrugations prior to their compression.

A tube according to the invention as well as apparatus for producing it will described by way of example with reference to the accompanying drawings.

FIG. 4 is an enlarged sectional view of a pressure roll used in the apparatus;

FIG. 5 is an enlarged fragmentary sectional view of the apparatus illustrating the formation of a locking detent in the tube;

FIG. 7 is an enlarged sectional view illustrating an optional form of pressure roll.

Figure 1:
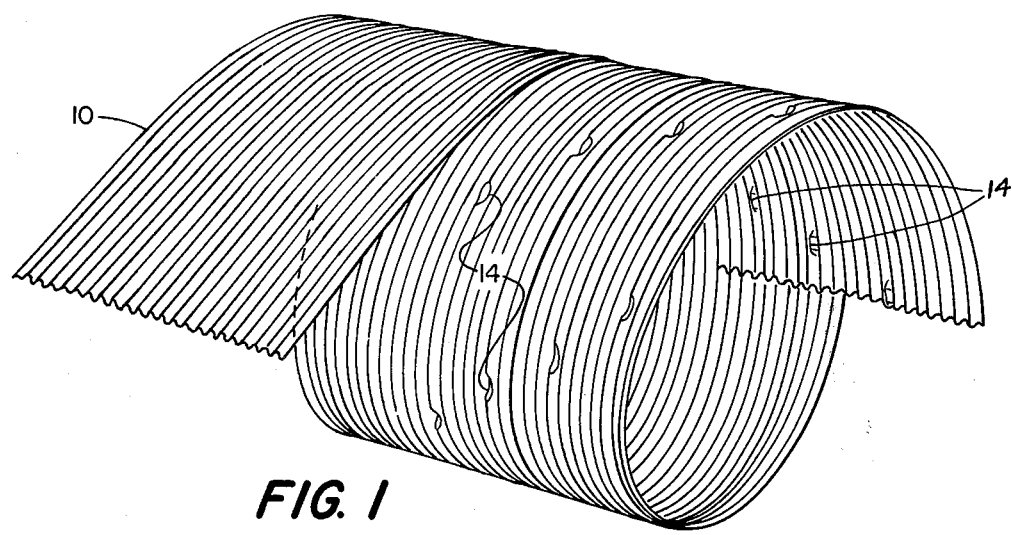
FIG. 1 is an isometric view of a tube, partially formed, according to the invention.
Figure 2:
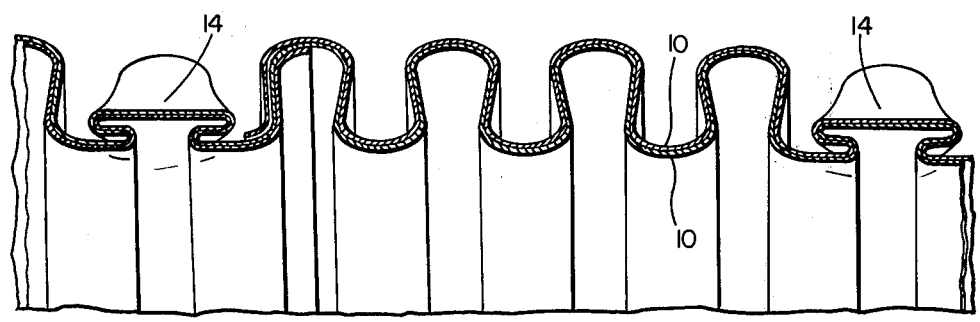
FIG. 2 is an enlarged fragmentary sectional view illustrating the invention.

The starting material for a tube, as shown in FIG. 1, according to the invention is a thin metal strip 10, which may be as thin as a fraction of a millimeter, with longitudinally extending corrugations. As shown in FIG. 2, the corrugations are substantially of wave form, the waves having arcuate crests alternating with similarly shaped troughs. The height of the corrugations is larger than their width and it is preferred to make this height at least twice as great as the width.

In order to produce a tube according to the invention, the strip 10 is spirally coiled onto a rotary driven mandrel 12 (FIGS. 3 and 6) in an oblique direction and at a predetermined angle of pitch, the interior diameter of the tube corresponding to the diameter of the mandrel. The angle of pitch is so selected that successive spirally coiled convolutions of the tube overlap each other along their borders, the extent of overlap being determined by the angle of pitch. In the embodiment shown in the drawings the angle of pitch is such that successive convolutions overlap each other for about half the width of the strip 10. FIG. 2 is a section through part of a wall of the tube produced from strip 10. As shown in FIG. 2 half of the width of each convolution of the strip overlaps half of the adjoining convolution so that the overlapping portion in each convolution has three corrugations.

As will be seen from FIG. 2, the corrugations in overlapping borders fit into each other in that manner that waves and crests of adjacent convolutions enter each other. In order to ensure a firm and secure union between the interfitting corrugations of successive convolutions, certain corrugations are periodically deformed during or subsequent to the coiling of the strip into a tube.

As illustrated in FIGS. 1 and 2, a plurality of detents 14 are formed in corrugations, every fifth corrugation in the illustrated embodiment, axially spaced by continuous, uninterrupted corrugations. The detents 14 on a particular corrugation are spaced from each other and are spaced about the circumference of the corrugation. As shown in FIG. 1, axially adjacent corrugations are circumferentially offset from each other, FIG. 2 showing adjacent detents axially aligned only as a convenience in illustration. As shown in FIG. 2, the detents have generally S-shaped configurations overlying on each side the corrugation troughs and locking together the overlying and underlying corrugations.

Advantageously, the detents thus formed strongly resist axial tension applied to the tube. Additionally the tube can be curved on a shorter radius than one having a continuous crimping of corrugations. Optionally, the tube may also be formed with the crests and troughs wider than the space therebetween to assist in locking the convolutions together, as described in U.S. Pat. No. 3,913,623.

Apparatus for producing the tube is shown in FIGS. 3-7. In the case of this apparatus, the strip 10 enters into contact with the circumference of the rotary driven mandrel 12 at a predetermined angle of pitch, the pitch being so selected that successive convolutions of the tube overlap each other by half the width of the strip. At the place where the oncoming strip makes the first contact with the mandrel, a first pressure roller 16 is arranged which is axially offset relative to the oncoming strip 10 by half the strip width, the roller being offset in the direction of that area of the mandrel surface onto which the convolutions of the strip are coiled and the axis of the roller being obliquely arranged relative to that of the mandrel at an angle which corresponds to the desired angle of pitch.

The pressure roller 16 is provided at its surface with circumferential grooves into which the corrugations of the strip enter when the latter passes the gap between mandrel and pressure roller 16. The depth of the grooves provided in the area of the pressure roller in contact with the oncoming strip is at least as great as the unreduced height of the strip corrugations so that these corrugations are not deformed whilst in contact with the roller area.

Figure 3:
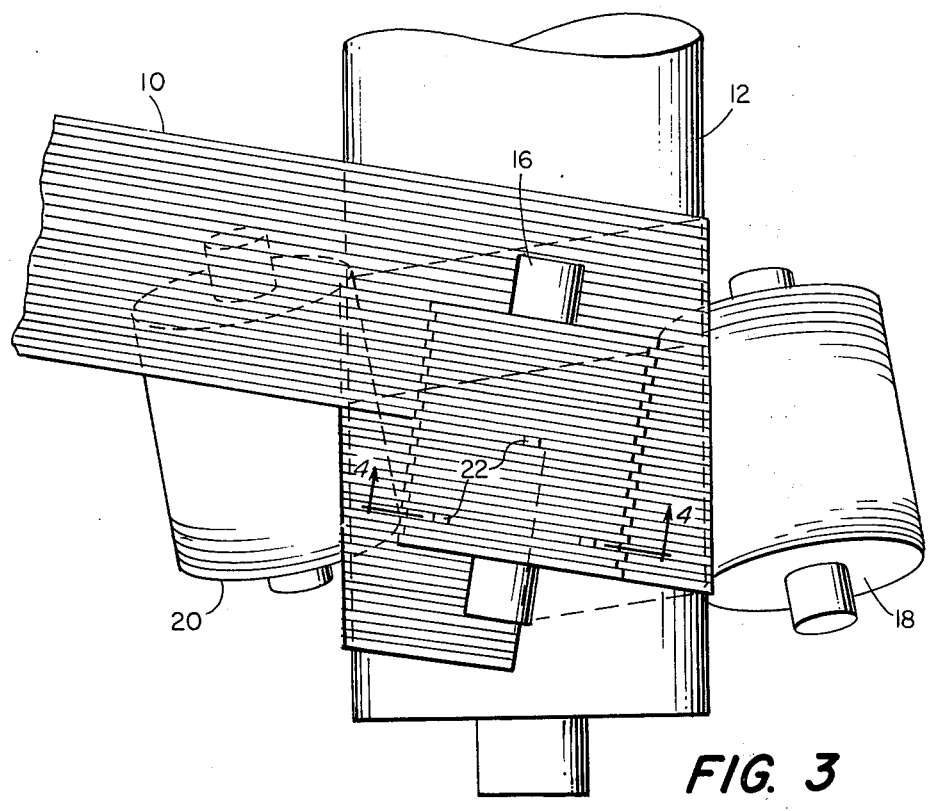
FIG. 3 is a plan view of apparatus forming the tube.

The remainder of the roller area - which extends over the previously-formed convolution - has ridges 22, best shown in FIGS. 3 and 4, spaced apart about the groove circumference, the ridges being provided in every fifth groove, the intervening grooves uninterrupted by ridges 22. Axially adjacent ridges are circumferentially offset. The ridges 22, as shown in FIG. 4, extend a limited distance toward the roller surface being spaced therefrom a distance about three times strip material thickness times the number of layers of strip material in the groove, i.e., six times the material thickness in the illustrated embodiment. The groove width is normally uniform but, in any event, as shown in FIG. 5, is wider at the ridges than the corrugations to permit formation of the crimped detent in the corrugation as the tube is formed.

Optionally the roller 16 may have the configuration illustrated in FIG. 7 in which the grooves extending over the previously formed convolution, in which the ridges 22 are located, also have bases shallower than the strip material corrugations, the width of these grooves also being greater than the corrugations. When the strip passes between the mandrel and the pressure roller 16, the afore-described configuration of the grooves causes the corrugations to be reduced in height which results in the cross-section of the corrugations having a shape as shown in FIG. 7 which can also be described as resembling a capital Greek Omega. In this way corrugations in the overlapping border portion of a just-formed convolution are locked to corrugations of the overlapped border portion of the adjoining convolution in the manner of hooks or teeth which engage with each other.

Figure 6:
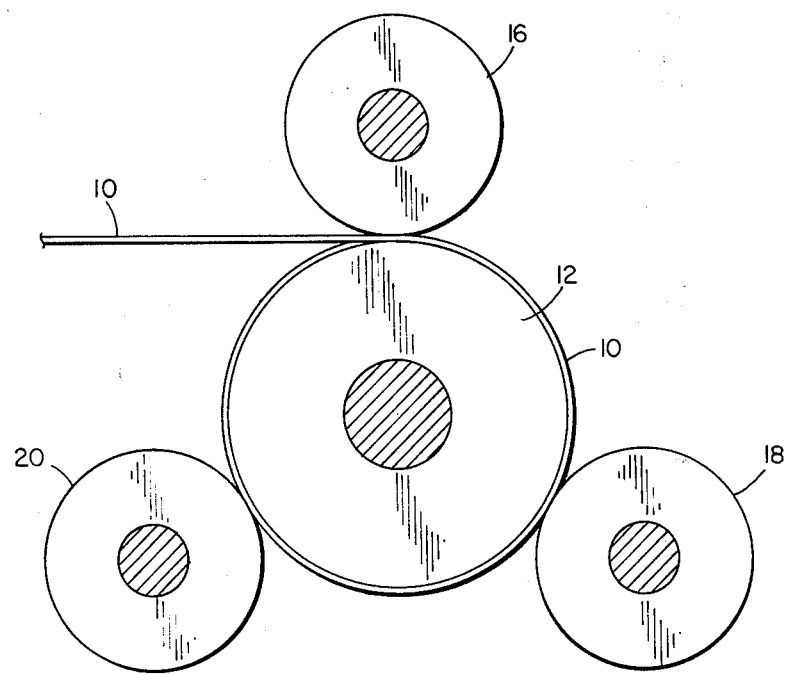
FIG. 6 is an end view of the apparatus.

The above-described design of the pressure roller 16 enables the corrugations in two successive convolutions to fit freely into each other at the feeding-in place of the strip, whilst at the same time an effective guiding of the strip is ensured which at this place is particularly useful and whereby the corrugations of the two convolutions are securely inserted into each other. As shown in FIGS. 3 and 6, two further pressure rollers 18, 20 are provided in addition to pressure roller 16, the three pressure rollers being distributed around the periphery of the mandrel 2 and spaced-apart from each other by arcs subtended by angles of 120°. The pressure rollers 18, 20 have circumferential grooves (not shown) which are similar to those in pressure roller 16, except that ridges are not provided in rollers 18, 20. Alternatively, the ridges could be provided in either roller 18 or 20 and omitted from the other rollers.

Other embodiments of this invention will occur to those skilled in the art which are within the scope of the following claims.

What is claimed is:

1. A flexible corrugated tube comprising a succession of axially displaced convolutions of spirally coiled thin metal strip having longitudinally extending corrugations, the corrugations being of wave form having alternating arcuate axially spaced crests and troughs, the borders of successive tube convolutions overlapping each other with at least one corrugation in the overlying border portion of one convolution fitting into one corrugation of the underlying border portion of an adjoining convolution, characterized in that a plurality of detents are provided in the crests of said interfitting corrugations, said detents are circumferentially spaced apart and positioned about said interfitting corrugations, portions of said interfitting corrugations having said wave form extend between said detents, and each detent forms a generally S-shaped crimp on each side of said interfitting corrugations overlying the adjacent trough and locks together said interfitting corrugations and said border portions of said overlapping convolutions.

2. The corrugated tube claimed in claim 1 in which a plurality of corrugations of the overlying border portion of one convolution fit into a plurality of corrugations of the underlying border portion of an adjoining convolution, further characterized in that a plurality of said interfitting corrugations are provided with said detents in their crests.

3. The corrugated tube claimed in claim 2 further characterized in that said detents in one corrugation are circumferentially offset about said tube from the detents in the next axially adjacent of said corrugations provided with detents.

4. The corrugated tube claimed in claim 2 further characterized in that said detents are provided in corrugations axially spaced from each other by corrugations having continuous crests uninterrupted by detents.

5. The corrugated tube claimed in claim 4 further characterized in that said detents in one corrugation are circumferentially offset about said tube from the detents in the next axially adjacent of said corrugations provided with detents.

6. The corrugated tube claimed in claim 1 further characterized in that said metal strip defines walls of said corrugations, including said crests and said troughs, and the axial distance between said walls on the concave sides of each of said crests and said troughs is greater adjacent said crests and troughs than the axial distance between said walls remote from said crests and troughs, said walls converging progressively away from concave sides of each of said crests and troughs.

* * * * *